United States Patent [19]  [11] Patent Number: 4,913,480
Yohe  [45] Date of Patent: Apr. 3, 1990

[54] CARGO CARRIERS FOR HELICOPTERS

[75] Inventor: Philip K. Yohe, Clarksville, Tenn.

[73] Assignee: The United States of America as represented by the Secretary of the Army, Washington, D.C.

[21] Appl. No.: 260,208

[22] Filed: Oct. 19, 1988

[51] Int. Cl.⁴ .......................... B66C 13/04; B64D 7/00
[52] U.S. Cl. .................................. 294/81.1; 294/81.5; 294/904; 244/137.4
[58] Field of Search ................... 294/81.1, 81.4, 81.41, 294/81.5, 81.51, 81.55, 68.3, 67.3, 67.4, 67.5, 904; 244/118.1, 118.2, 137.4; 212/146, 147; 410/2-4

[56] References Cited

U.S. PATENT DOCUMENTS 3,502,365 3/1970 Callow ............................... 294/81.1
3,747,970 7/1973 Fathauer et al. .................... 294/81.1

Primary Examiner—Johnny D. Cherry
Assistant Examiner—Dean J. Kramer
Attorney, Agent, or Firm—Norman L. Wilson, Jr.

[57] ABSTRACT

In external cargo carrying helicopters single or multiple point suspension cargo slings are attached to cargo hooks on the undersides of helicopter fuselages. It is common practice to use such helicopters to transport motorized vehicles with those cargo slings, but transporting such vehicles presents a rigging problem. This method of transporting such vehicles is frequently impractical, either because of the excessive number of sorties necessary to transport the vehicles, or because when two vehicles are carried at once they bump against each other. By this invention a cargo adapter is provided by which two vehicles can be carried without bumping against each other during flight.

6 Claims, 2 Drawing Sheets

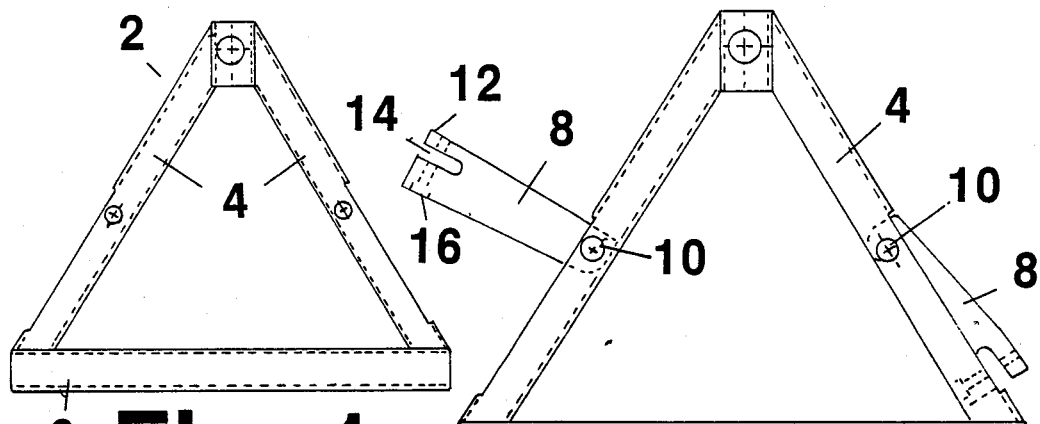
Fig. 1
Fig. 2
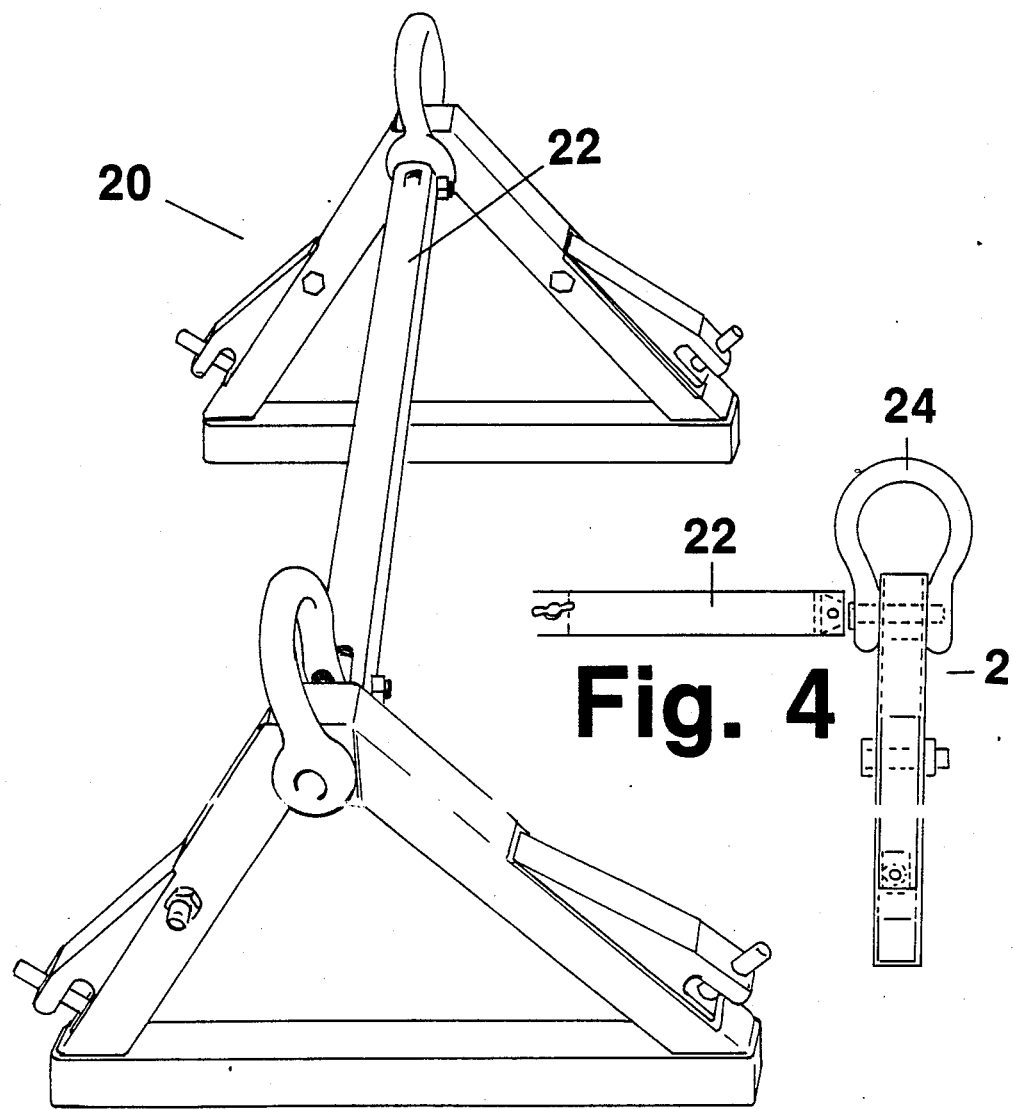
Fig. 3
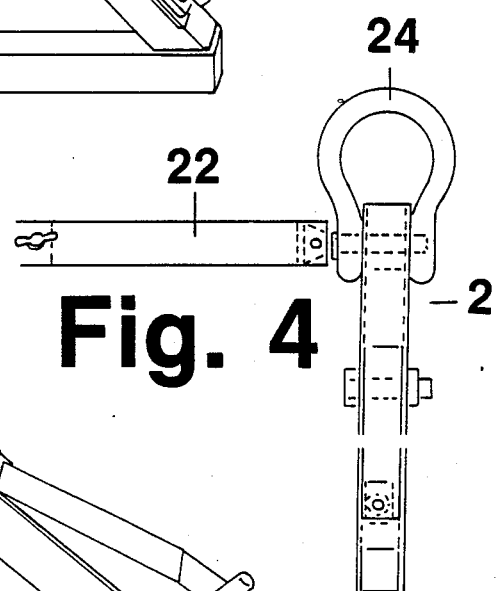
Fig. 4

4,913,480

CARGO CARRIERS FOR HELICOPTERS

BACKGROUND OF THE INVENTION

This invention, in one of its aspects, pertains to external cargo carriers for helicopters. In a more specific aspect the invention relates to sling carriers capable of carrying motorized vehicles. Even more specifically, the invention is concerned with devices empowering multiple motorized vehicle lifts.

In external cargo carrying helicopters single or multiple point suspension cargo slings are attached to cargo hooks on the undersides of helicopter fuselages, generally positioned relative to the center of gravity of the helicopter. It is common practice to use such helicopters to transport motorized vehicles to the front, for assault and retrograde operations, or to an area where maneuvers are being conducted. However transporting such vehicles presents a rigging challenge, even in the case of smaller vehicles such as jeeps and automobiles. Large vehicles such as tanks and high mobility, multipurpose, wheeled vehicles (HMMWVs) are an even greater challenge. Moreover this method of transporting such vehicles is frequently impractical, either because of the excessive number of sorties necessary to transport the vehicles, or the limited number of available aircraft.

The Chinook was brought into service with the thought the HMMWVs could be carried inside them, but the HMMWVs were too wide to be easily loaded inside its fuselage. Hence sling loading still must be employed even with the Chinook, using its dual tandem cargo hook suspension system. However with helicopters capable of carrying heavier loads multiple lifts are being considered. With the Chinook it is possible to carry two HMMWVs instead of one, as in the case of the Black Hawk. But in carrying two vehicles, rigging is even more difficult. In a helicopter cargo carrying environment there are so many force components and degrees of movement that vertical, lateral, and rotational moments are difficult to control. Because of these moments a simple tow bar cannot be used. It simply would not restrain rotational forces. The use of two cargo hooks prevents the load from revolving. Nevertheless the rotational component still introduces a jack knifing effect. Hence rigging so that the system is stable is not a simple matter in any case in which a heavy load is swinging from the bottom of a helicopter. In the case of two vehicles, which must be carried so that they will not bump against each other, rigging is particularly challenging. Bending moments must be considered in addition to vertical, horizontal, and rotational forces.

As pointed out in the Department of Navy report NSAP Task Q-1-85, RW-2R-86, attachment of vehicles in tandem to a single rigid lift beam under helicopters would require a beam of such large dimensions that operation and stowage requirements could not be met. Accordingly, as described in the report, the vehicles are carried side-by-side. Positioning or spreader bars were installed laterally across the HMMWV's forward and aft sling points, providing lateral vehicle separation. This loading has the disadvantage that excessive lateral motion can still cause vehicle damage. In fact cylindrical hood protectors are suggested to preclude hood or windshield damage. In addition the device described in the report cannot be used on automobiles and jeeps not equipped with sling points on their hoods and trunks. By the practice of this invention a cargo adapter is provided which is so constructed that the two vehicles being carried can not bump against each other during flight. The tandem positioning unit provided herein does not require special hood and trunk attachment points, and, therefore, can be used with jeeps and automobiles. In addition the tandem action resulting causes the vehicles to act as one while in flight.

SUMMARY OF THE INVENTION

In accordance with this invention a coupling unit is provided for linking two motorized vehicles rear bumper to rear bumper so that they can be carried by a helicopter external cargo carrier. The coupling unit enables them to be carried as a single, stable, load. The coupling unit includes two truss members and a beam joining them into a single unit with the truss members as ends of the framework. The truss members have inclined truss posts, and struts secured to them as strengthening members forming the truss members. The beam is connected to each truss member so that the truss posts are inclined outwardly toward the base of each truss end member. Arm members are hinged at one end to each inclined truss post. The other end of each arm member is adapted to be connected to a motorized vehicle bumper lift provision, sometimes referred to as a sling point. The length of the arm member and the size of the truss members are such that when the load is lifted the rear end of each motorized vehicle rest on the inclined truss posts so that a force on either vehicle causes the other vehicle to move in synchronization with it, stabilizing the load. Means are provided for attaching helicopter cargo lines to the coupling unit.

DESCRIPTION OF THE DRAWINGS

FIG. 1 is an end view of one form of truss member constituting a part of this invention.

FIG. 2 is a similar view showing the necessary arms which are hinged to the truss members.

FIG. 3 is a perspective view of the complete coupling unit of the invention.

FIG. 4 is a front view showing the cargo line shackle and one way to attach the beam to the truss member.

DESCRIPTION OF A PREFERRED EMBODIMENT

Figure 5:
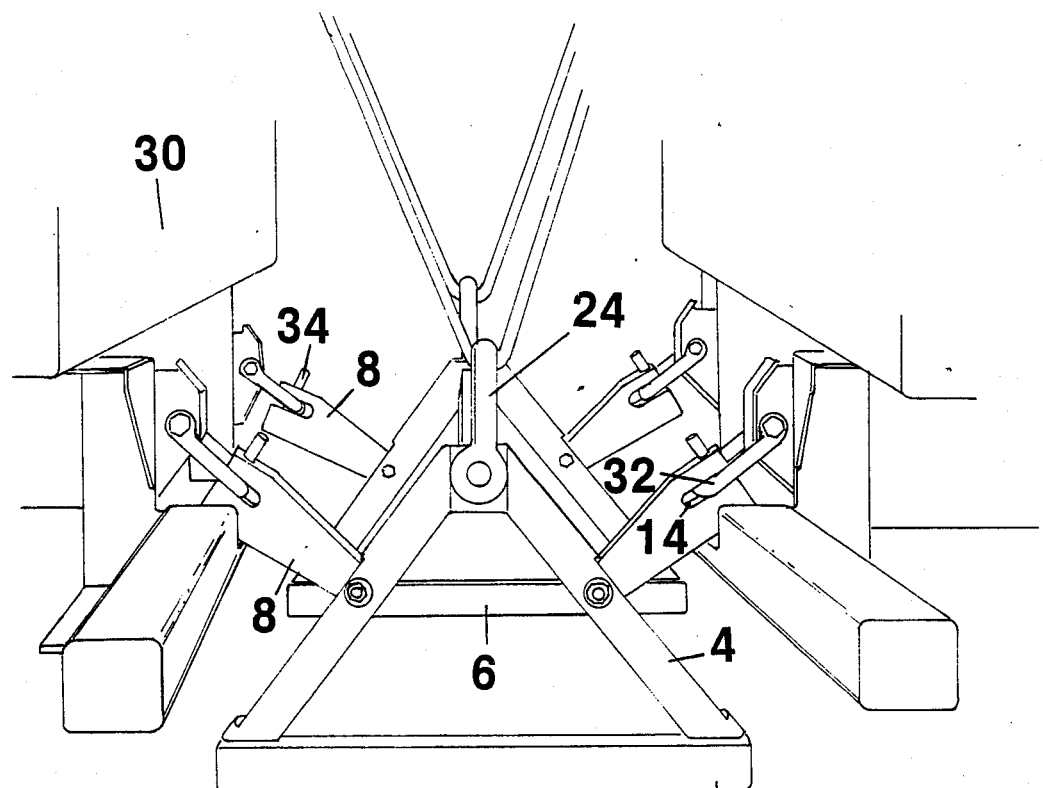
FIG. 5 is an end view showing how the coupling unit links the two motorized vehicles together.

Referring now to FIG. 1, one of the components of the coupling unit of this invention is a truss member 2. This member can be trapezoidal or triangular in cross section to provide inclined posts or sides 4. In the embodiment preferred herein the triangular truss member is used. To reinforce the truss member a strut 6 is employed, additional struts being used in the case of trapezoidal truss members. The truss posts and struts of the truss member can be permanently connected by any known means such as welding and the like.

It is to be noted that in any case the truss member is provided with inclined truss posts or sides 4 so that the base is wider than the top of the truss member. The reason for this will become apparent when the use of the coupling unit is described. Each inclined truss post 4 of the truss member 2 is provided with an arm member 8. These arm members are hinged to inclined truss post 4 at 10, using a bolt or other suitable hinge means means. The free end 12 of arm member 8 is adapted to be connected to the lift provision or sling point which is integral with the vehicle to be transported. In our preferred embodiment arm member 8 is provided with a slot 14 and a pin or bolt hole 16 to receive a ring or plate.

FIG. 3 shows an assembled coupling unit 20. It can be seen that the two truss members 2 are joined by beam 22. Although this beam could be welded in place the size and weight necessary to confer the desired strength on the unit renders more desirable the use of a removable connection permitting the unit to be disassembled for handling and storage. This can be seen in FIG. 4, which also shows shackle 24 adapted to receive helicopter cargo lines. In the embodiment shown, beam 22 is attached to both the truss member 2 and the shackle 24. Shackle 24 and beam 22 can be secured to truss member 2 with the same bolt, nut and locking pin. The coupling unit of the invention thus includes end truss members 2, and a beam 22 joining them. The coupling unit 20 also includes shackles 24 for helicopter cargo lines, and arm members 8 to which the motorized vehicle is attached.

Figure 6:
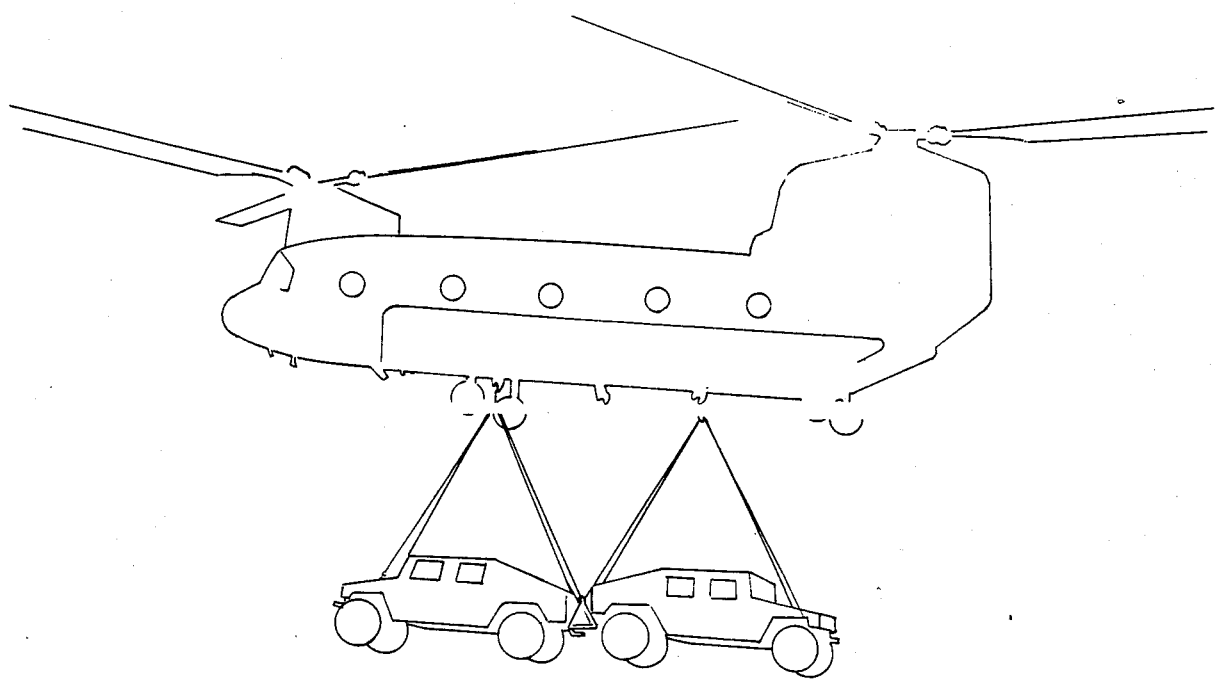
FIG. 6 is a diagrammatic representation showing how the two vehicles are lifted in tandem by a helicopter.

Consideration will now be accorded the operation of the coupling unit 20 of the invention. FIG. 5 shows the back ends of two vehicles 30 adapted with rings 32 to receive cargo hooks. In this instance the diameter of ring 32 is equal to the width of slot 14 (FIG. 2). To connect coupling unit 20 to the vehicles 30 the arm member 8 comes into play. The hinge 10 (FIG. 2) makes rigging easier. Because of hinge 10 arm member 8 can be slipped over ring 32 without lifting the heavy coupling unit. A pin 34 secures coupling unit 20 to the rings. The two back-to-back vehicles are now ready to be transported. This is accomplished by attaching helicopter cargo lines to cargo hooks or bumpers in the front of the vehicle and shackles 24 on coupling unit 20. Military vehicles are provided with so-called bumper lift provisions in the form of plates or shackles capable of accepting towing lines. The inclined truss posts now come into play. Each arm member 8 is designed to be a given length. Two vehicles being carried by a helicopter are shown in FIG. 6. The length of the arm members is such that when carried as shown the rear ends of each motorized vehicle rest on the inclined truss posts 4. This makes the two vehicles an integral unit acting as one entity. A force on either vehicle makes the other vehicle move in synchronization with it. This stabilizes the load. During testing the vehicles were flown at air speeds up to 125 knots, and carefully watched while the aircraft banked at steep angles. It was found to be quite stable, hanging like a single body.

It will be appreciated that given the teachings of this invention other considerations, parameters, and variations will occur to those working in this field. Thus trusses 2 and beam 22 can be solid bar members or square tubing fabricated of strong metals such as steel. Members 2 can by any of the well known truss shapes, so long as they have inclined truss posts and are sufficiently strong so that they will not collapse under the weights of the two vehicles resting against them. It will also be apparent that the size of the truss members, the slope of their inclined truss posts, and the lengths of arms 8 will be generally in direct proportion to the size of the vehicles. The coupling unit must be large enough so that the vehicle ends will rest on it. Desirably the coupling unit will be sized so that it can be attached to the vehicles without being lifted. In addition coupling elements, such as slot 14 and pin 16 in arms 8, and shackles 24, will depend upon the connectors cooperating with them. The cables lifting the vehicles will be chains, steel cable or whatever the particular helicopter is employing. Such modifications and ramifications will occur to those skilled in the art. Hence they are deemed to be within the scope of this invention.

What is claimed is:

1. A coupling unit for linking two motorized vehicles rear-bumper-to-rear-bumper so that the two motorized vehicles can be carried by a helicpopter's external cargo carrier as a single, stable, load, comprising truss members each having inclined truss member side posts, a shorter strut secured to the truss member sides to form a top end and a longer strut secured to the truss member sides to form a base end, with the truss member sides being inclined outwardly toward the base of each truss member, a beam, means connecting each end of the beam to the top end of each truss member so that the truss members are secured to the ends of the beam to form the coupling unit, arm members hinged at one end to each inclined truss member side, means connecting the other end of each arm member to a motorized vehicle bumper lift provision, or sling point, the hinge permitting this connection to be readily accomplished, the length of the arm member and the size of the truss members being such that when the load is lifted the rear end of each motorized vehicle rests on inclined truss member sides so that a force on either vehicle causes the other vehicle to move in synchronization therewith, stabilizing the load, and means on said coupling unit for attaching helicopter cargo lines to the coupling unit.

2. The coupling unit of claim 1 in which the means connecting the beam ends to the top end of each truss member are removable connecting means so that the beam can be disconnected from the truss members.

3. The coupling unit of claim 1 in which the shorter strut forming the top end of each truss member is long enough to form trapezoidally shaped truss members.

4. The coupling unit of claim 1 in which the shorter strut forming the top end of each truss member is short enough to form triangularly shaped truss members.

5. The coupling unit of claim 4 in which there are only two truss members.

6. The coupling unit of claim 5 including attachment means on each truss member for connecting helicopter cargo lines to the coupling unit, the helicopter cargo lines being manipulated by a helicopter hoist for tandem air transport of motorized vehicles.

* * * * *